March 21, 1950 F. L. CUNOW 2,501,212

RECEIVER AND TRANSMITTER TELEPHONE DESK SET

Filed Nov. 30, 1948

INVENTOR.
FRED L. CUNOW.
BY Edward [signature]
ATTORNEY.

Patented Mar. 21, 1950 2,501,212

UNITED STATES PATENT OFFICE 2,501,212

RECEIVER AND TRANSMITTER TELEPHONE DESK SET

Fred L. Cunow, New York, N. Y.

Application November 30, 1948, Serial No. 62,617

4 Claims. (Cl. 179—1)

This invention relates to new and useful improvements in receiver and transmitter telephone desk sets.

The receiver and transmitter telephone desk sets heretofore known embody numerous deficiencies which this invention overcomes. In prior desk sets microphones are used to pick up the audible frequency sounds from the telephone receiver and communicate them first to an amplifier and then to a loud speaker. The defect in this arrangement resides in the fact that the microphones also pick up noises foreign to the telephone receiver. These noises are amplified and interfere with the clarity of the instrument. An important object of this invention is the use of a magnetic pick-up for magnetically picking up the sounds coming over the telephone receiver and converting same into electrical impulses which are amplified and then heard over the loud speaker. The magnetic pickup will not pick up foreign audible noises.

In prior receiver and telephone desk sets the amplifiers were mounted in the same boxes or housings which hold the telephone transmitters and receivers, and sometimes the loud speakers and transmitter microphones were also housed in the same boxes or housings. The inherent deficiency in this arrangement resides in the fact that electrical and mechanical interference between these various apparatus will develop and so interfere with the clarity of the reception and transmission.

It is another object of this invention to house the amplifiers and the receiver loud speaker and transmitter microphone separately from the housing upon which the telephone receiver and transmitter is placed. It is proposed to limit this latter housing merely to contain a magnetic pick-up and a transmitter loud speaker. It is also proposed to provide the housing for the telephone receiver and transmitter with a switch and a signal lamp for indicating that upon conclusion of the conversation the telephone receiver and transmitter must be replaced upon the telephone instrument.

As already stated, prior telephone desk sets have been constructed with the receiver loud speaker and transmitter microphone housed in the same housing which contain the other portions of the mechanism of the desk set. This invention particularly proposes that the receiver loud speaker and transmitter microphone be merely connected with the amplifiers by wires so that they may be moved to any place in the home or office remote from the telephone.

Another and important object of this invention resides in the provision of certain means for supporting the magnetic pick-up in selected positions about the telephone receiver so that it may be placed in the strongest portion of the magnetic field of the telephone receiver. It is proposed that the housing be provided with a certain shaped opening for the telephone receiver to engage into, and that a certain slide means be also provided for insuring that the telephone receiver assumes a certain position relative to the magnetic pick-up to further insure the greatest efficiency of the instrument.

The new receiver and transmitter telephone desk set, in accordance with this invention, has many uses. It is particularly intended for businessmen, bankers, lawyers, sales personnel, publishers, doctors, hospitals, broadcasting stations, advertising agencies, luncheonettes, etc. When two or more receiver and transmitter telephone desk sets are used simultaneously, it is possible to connect two or more incoming telephone calls—local or long distance. Two or more parties may then participate in telephone conversations on the wires. The called person does not have to move from one telephone to the other in order to participate in such conversations or conferences. This great advantage is not available in prior instruments.

Another object of this invention is the construction of a device as described which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figures 1, 2, 3, 4, 5:
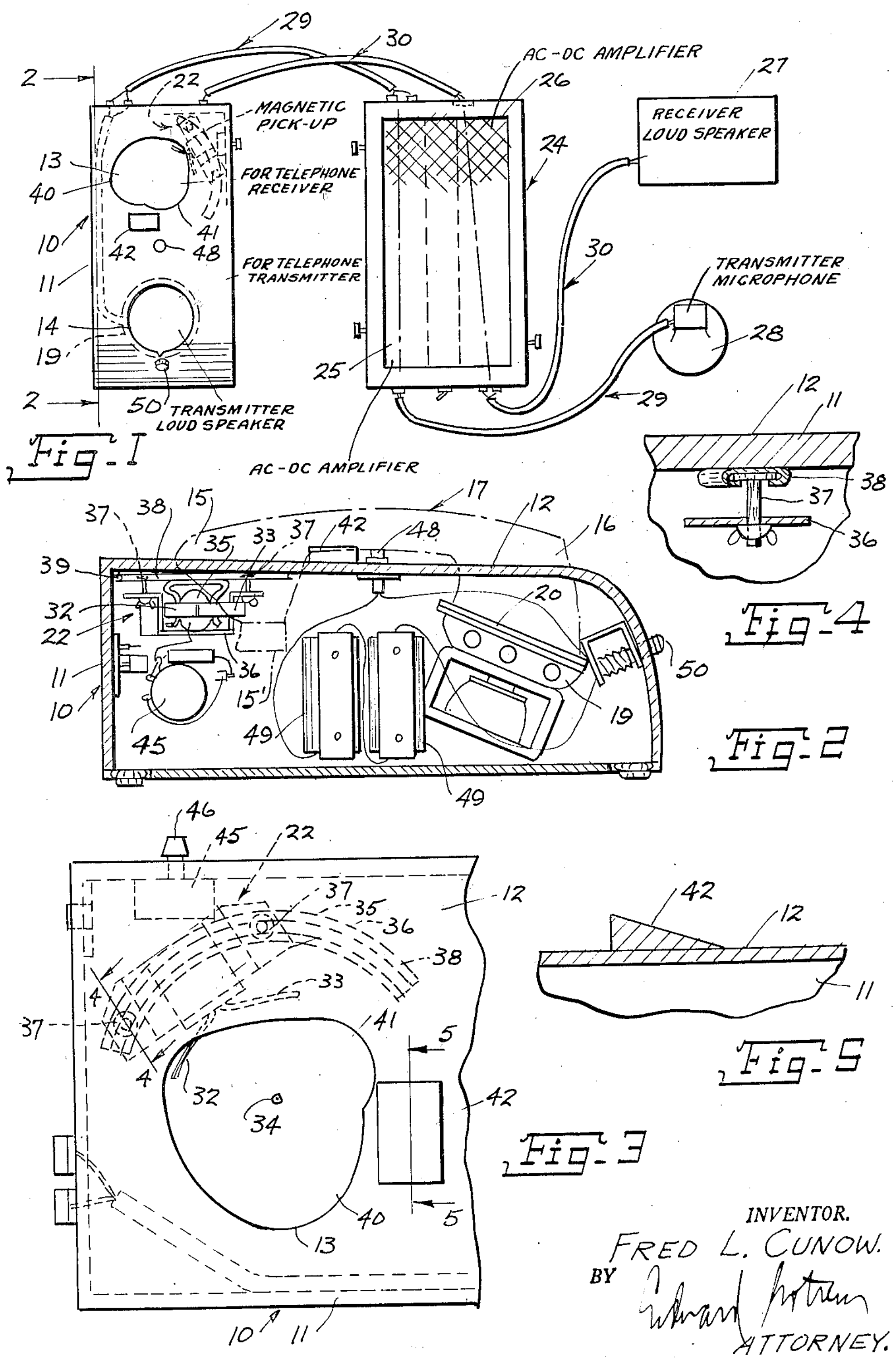
Fig. 1 is a plan view of a receiver and transmitter for telephone desk set constructed in accordance with this invention.
Fig. 2 is an enlarged vertical sectional view taken on the line 2—2 of Fig. 1.
Fig. 3 is a fragmentary enlarged detailed view of a portion of Fig. 1 showing particularly the details of the housing for the telephone desk set and the magnetic pick-up thereof.
Fig. 4 is a fragmentary vertical sectional view taken on the line 4—4 of Fig. 3.
Fig. 5 is a vertical sectional view taken on the line 5—5 of Fig. 3.

The receiver and transmitter telephone desk set, in accordance with this invention, includes a desk unit 10 provided with a housing 11 having a top wall 12 which is provided with a receiver opening 13 and a transmitter opening 14 for receiving the receiver 15 and transmitter 16 of a telephone hand set 17 placed on said housing 11. Said telephone hand set 17 is schematically illustrated in dot and dash lines in Fig. 2. A transmitter loud speaker 19 is mounted within said housing 11 and is so positioned as to engage against said transmitter 16. The transmitter loud speaker 19 is provided with a surrounding rubber gasket 20 for engaging against the transmitter 16 so as to soundproof the connection between these parts. A magnetic pick-up 22 is mounted within the housing 11 adjacent said receiver opening 13.

An amplifier unit 24 is separate from the desk unit 10 and is adapted to be placed at a convenient distance from the desk unit 10. This amplifier unit 24 includes two A. C.-D. C. amplifiers, schematically indicated upon the drawing by reference numerals 25 and 26. A receiver loud speaker 27 is provided which is separate from the units 10 and 24. A transmitter microphone 28 is also provided separate from said units 10 and 24 and the loud speaker 27. A circuit 29 connects said transmitter loud speaker 19 with said amplifier 25 and with said transmitter microphone 28 in order that spoken words and sounds picked up by the transmitter microphone 28 will be transmitted to the transmitter loud speaker 19 and then to the telephone transmitter 16. Another circuit 30 connects said magnetic pick-up 22 with the amplifier 26 and with the receiver loud speaker 27 in order that sounds picked up from the telephone reeciver 15 by the magnetic pick-up 22 will be transmitted to the loud speaker 27.

The details of the amplifiers 25 and 26 and of the loud speakers 19 and 27 and the microphone 28 form no part of this invention and therefore will not be further outlined in this specification. However, the arrangement of the magnetic pick-up 22 is important. In the first place the magnetic pick-up 22 is provided with a laminated core consisting of two sections 32 and 33 which are disposed arcuately concentric with a point 34 corresponding approximately with the center of the telephone receiver 15. The laminated core 32, 33 is engaged within a coil 35 which is supported by a bracket 36 supported by a pair of clamp screws and nuts 37. These clamp screws and nuts 37 have the heads of the screws slidably engaging in an arcuate track 38 which is mounted upon a block 39, in turn mounted on the bottom face of the top wall 12 of the housing 10. This arcuate track 38 is arranged concentric with the point 34. The arrangement is such that the nuts of the screws and wing nuts 37 may be loosened and then the entire bracket 36 may be shifted along the track 38.

The telephone receiver opening 13 is not round but of heart shape having lobes 40 and 41. A slide-like member 42 is mounted upon the top of the top wall 12 at a location so as to guide the telephone receiver into the lobe 41. The top wall 12 slopes downwardly from the back of the housing 11 to the front in order that the telephone hand set 17 may have a tendency to slide down the slope so that the receiver 15 slides out of the lobe 40 of the opening 13 and into the lobe 41. The telephone transmitter opening 14 is round. The arcuate ends 32 and 33 of the core of the magnetic pick-up are at a location above the bottom end 15′ of the telephone receiver 15, see Fig. 2, so as to be located adjacent the magnets of the telephone receiver. The telephone hand set 17 is placed into a correct position by first engaging the telephone transmitter 16 down into the opening 14 and then engaging the telephone receiver 15, first into the lobe 40 of the receiver opening 13 so that the bottom flange 15′ of the telephone receiver 15 is below the laminated core 32, 33, and then releasing the telephone hand set so that the slope of the top wall 12 and the slide-like member 42 guides the receiver portion 15 laterally into the lobe 41 and towards and against the core 32, 33 of the magnetic pick-up 22.

The magnetic pick-up 22 is provided and connected with a volume control 45 which is mounted on one of the walls of the housing 11 and which is provided with a knob 46 for controlling the volume. The details of the volume control will not be given in this specification as it forms no part of the invention.

A push button switch 48 is mounted through the top wall 12 and is connected in a circuit which includes a pair of dry cells 49 and a signal lamp 50 mounted on the front of the housing 10.

The operation and use of the new receiver and transmitter for telephone desk sets may be understood from the following:

First of all it is necessary that the magnetic pick-up 22 be adjusted so that the laminated core 32, 33 is in the strongest magnetic field of the telephone receiver. This is done by loosening the wing nuts of the screws and nuts 37 and adjusting the magnetic pick-up 22 along the track 38. The correct position may be located by first inserting the telephone receiver 15 in the opening 13 and moving the telephone transmitter portion 16 of the hand set 17 about the opening 13 as a pivot, while the receiver and transmitter for the telephone hand set is in operation so that the position of the strongest field may be detected at the loud speaker 27. Once this field is detected, the strongest point is noted, and the magnetic pick-up 22 is adjusted to its proper position. The wing nuts and screws 37 are tightened so as to permanently hold the magnetic pick-up 22 in its adjusted position.

The amplifiers 25 and 26 must be suitably adjusted so as to properly amplify the sounds. Now the amplifier unit 24 may be placed anywhere in the home or other establishment. Smiliarly, the receiver loud speaker 27 and the transformer 28 may be placed wherever desired. Incoming sounds from the telephone receiver 15 will be heard through the receiver loud speaker 27. Outgoing sounds are first picked up by the transmitter microphone 28 and then transmitted to the transmitter loud speaker 19 and the transmitter 16 of the telephone hand set 17.

Whenever the telephone hand set 17 is in position upon the housing 11 it will engage the push button switch 48 in order that the light 50 will indicate that the telephone hand set 17 must be placed back upon the telephone instrument when the conversation is concluded. When the telephone hand set 17 is placed upon the housing 11 the transmitter end 16 is first engaged through the transmitter opening 14 and then the receiver end 15 is engaged into the opening 13 and through the lobe 40 thereof in order that the receiver 15 passes down below the projecting end or ends of the core 32, 33 of the magnetic pickup 22. When the telephone hand set is released, the slide-like member 42 and slope of the top wall 12 will cause it to slide over into the lobe 41 and into correct position in relation to the magnetic pick-up 22.

An important feature of the new receiver and transmitter telephone desk set resides in the fact that the amplifier unit 24 is separate from the housing 10 and from the loud speaker 27 and microphone 28. For this reason mechanical and electrical interferences from the vicinity of the housing 10 will not affect the amplifier unit 24, nor the loud speaker 27 or microphone 28. The desk unit 10 will be relatively small and light because it does not contain the amplifier units. It will therefore by very suitable for placement on desks and small tables adjacent the telephone instrument. Because of the circuits 29 and 30 the amplifier unit 24 may be at any suitable location as well as the receiver loud speaker 27 and transmitter microphone 28.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. In a receiver and transmitter for telephone desk sets, a housing having a top wall sloping downwards from the back to the front and provided with a receiver opening at the back and a transmitter opening at the front for receiving the receiver and transmitter respectively of a telephone hand set placed on said housing, said transmitter opening being circular and acting as a pivot upon which said telephone hand set may be pivoted right and left and said receiver opening being of heart shape in order that said telephone hand set may turn about said transmitter opening so that the receiver of the telephone hand set may be pivoted laterally from one into the other of the lobes of said heart shape, an arcuate track, means for mounting said arcuate track on the inner face of said top wall concentric with said telephone receiver when placed in said latter mentioned lobe of said heart shape, a magnetic pick-up having an arcuate protruding core substantially concentric with said arcuate track and means for adjustably mounting the arcuate protruding core of said magnetic pick-up on said track in order to be movable about said telephone receiver at its latter mentioned position to a position of maxamum magnetic field, and a slide-like member mounted on said top wall adjacent said receiver opening and extending downwards in a lateral direction towards said latter mentioned lobe of said heart shaped opening for guiding in collaboration with said sloping top wall said telephone receiver frontwards and laterally into said latter mentioned lobe of said heart shaped opening.

2. In a receiver and transmitter for telephone desk sets, a housing having a top wall sloping downwards from the back to the front and provided with a receiver opening at the back and a transmitter opening at the front for receiving the receiver and transmitter respectively of a telephone hand set placed on said housing, said transmitter opening being circular and acting as a pivot upon which said telephone hand set may be pivoted right and left and said receiver opening being of heart shape in order that said telephone and set may turn about said transmitter opening so that the receiver of the telephone hand set may be pivoted laterally from one into the other of the lobes of said heart shape, an arcuate track, means for mounting said arcuate track on the inner face of said top wall concentric with said telephone receiver when placed in said latter mentioned lobe of said heart shape, a magnetic pick-up having an arcuate protruding core substantially concentric with said arcuate track and means for adjustably mounting the arcuate protruding core of said magnetic pick-up on said track in order to be movable about said telephone receiver at its latter mentioned position to a position of maximum magnetic field, and a slide-like member mounted on said top wall adjacent said receiver opening and extending downwards in a lateral direction towards said latter mentioned lobe of said heart shaped opening for guiding in collaboration with said sloping top wall said telephone receiver frontwards and laterally into said latter mentioned lobe of said heart shaped opening, said means for adjustably mounting the arcuate protruding core of said magnetic pick-up including a bracket supporting the magnetic pick-up, and screws with wing nuts adjustably mounted on said track and connected with said bracket.

3. In a receiver and transmitter for telephone desk sets, a housing having a top wall provided with a receiver opening for receiving the receiver of a telephone hand set, an arcuate track means for mounting said arcuate track on the inner face of said top wall concentric with said telephone receiver when placed in said opening, and a magnetic pick-up having an arcuate protruding core substantially concentric with said arcuate track and means for adjustably mounting the arcuate protruding core of said magnetic pick-up on said track in order to be movable about said telephone receiver when in said latter mentioned position to a position of maximum magnetic field.

4. In a receiver and transmitter for telephone desk sets, a housing having a top wall provided with a receiver opening for receiving the receiver of a telephone hand set, an arcuate track means for mounting said arcuate track on the inner face of said top wall concentric with said telephone receiver when placed in said opening, and a magnetic pick-up having an arcuate protruding core substantially concentric with said arcuate track and means for adjustably mounting the arcuate protruding core of said magnetic pick-up on said track in order to be movable about said telephone receiver when in said latter mentioned position to a position of maximum magnetic field, said means for adjustably mounting the arcuate protruding core of said magnetic pick-up including a bracket supporting said magnetic pick-up, and screws with nuts adjustably mounted on said track and connected with said bracket.

FRED L. CUNOW.

REFERENCES CITED

The following references are of record in the file of this patent:

UNITED STATES PATENTS

| Number | Name | Date |
|---|---|---|
| 1,842,190 | Ochse | Jan. 19, 1932 |
| 2,005,973 | Hellmann | June 25, 1935 |
| 2,071,053 | Varley | Feb. 16, 1937 |
| 2,160,829 | Cherry | June 6, 1939 |
| 2,214,992 | Chevassus | Sept. 17, 1940 |
| 2,402,341 | Patterson | June 18, 1946 |